United States Patent
Lövgren et al.

(10) Patent No.: US 6,776,610 B2
(45) Date of Patent: Aug. 17, 2004

(54) BURNER ARRANGED WITH A MIXING CHAMBER FOR FUEL AND COMBUSTION AIR

(75) Inventors: Hans Lövgren, Hallstahammar (SE); Thomas Lewin, Hallstahammar (SE)

(73) Assignee: Sandvik AB, Sandviken (SE)

( * ) Notice: Subject to any disclaimer, the term of this patent is extended or adjusted under 35 U.S.C. 154(b) by 0 days.

(21) Appl. No.: 10/472,879

(22) PCT Filed: Feb. 15, 2002

(86) PCT No.: PCT/SE02/00265

§ 371 (c)(1), (2), (4) Date: Sep. 18, 2003

(87) PCT Pub. No.: WO02/075212

PCT Pub. Date: Sep. 26, 2002

(65) Prior Publication Data

US 2004/0076916 A1 Apr. 22, 2004

(30) Foreign Application Priority Data

Mar. 19, 2001 (SE) .............................. 0100947

(51) Int. Cl.[7] .............................. F23D 14/00; F24C 3/00
(52) U.S. Cl. ...................... 431/215; 431/353; 126/91 A
(58) Field of Search ........................... 431/5, 9, 10, 12, 431/159, 170–173, 181, 215, 185–188, 350, 353, 354; 126/91 A, 91 R, 116 R; 432/209, 223

(56) References Cited

U.S. PATENT DOCUMENTS

| | | | | |
|---|---|---|---|---|
| 3,688,760 A | * | 9/1972 | Rudin | 126/91 A |
| 4,809,672 A | * | 3/1989 | Kendall et al. | 126/91 A |
| 5,975,887 A | | 11/1999 | Kamal et al. | 431/181 |
| 6,082,993 A | * | 7/2000 | O'Leary et al. | 431/18 |
| 6,425,754 B1 | | 7/2002 | Lindskog | 431/5 |

FOREIGN PATENT DOCUMENTS

| | | |
|---|---|---|
| DE | 1 245 527 B | 7/1967 |
| GB | 504703 A | 4/1939 |

* cited by examiner

Primary Examiner—James C. Yeung
(74) Attorney, Agent, or Firm—Alfred J. Mangels

(57) ABSTRACT

A gas burner in which a burner head is positioned within an inner pipe that is surrounded by an outer protective pipe. Fuel is delivered to the burner head through a fuel conduit positioned within the inner pipe, and combustion air is delivered through the inner pipe. The fuel conduit terminates short of the burner head and the wall of that conduit is provided with a plurality of holes. A further pipe surrounds at least the perforated part of the fuel conduit, and one end of the further pipe extends to the the burner head while the other end is sealed against the fuel conduit to form a mixing chamber between the outside of the fuel conduit and the inside of the further pipe. A second conduit is provided to conduct a given amount of air to the mixing chamber.

4 Claims, 1 Drawing Sheet

BURNER ARRANGED WITH A MIXING CHAMBER FOR FUEL AND COMBUSTION AIR

BACKGROUND OF THE INVENTION

1. Field of the Invention

The present invention relates to a burner for industrial furnaces.

Swedish Patent Specification No. 9800473-2describes a method of cleansing the waste gases from a gas burner or some other combustion source, such as oil-fired burners, or the exhaust gases from internal combustion engines. The invention also relates to a gas burner in which the method is employed.

2. Description of the Related Art

It is usual to heat industrial furnaces with the aid of gas burners. The fuel normally used is natural gas, although other gases may be used, such as propane, butane and liquefied petroleum gas or bottled gas.

An example of an effective gas burner is a burner of the type where the burner head is placed in one end of an inner pipe around which there is placed an outer protective pipe which is closed at its bottom. The combustion gases or flue gases leaving the burner chamber pass into the inner pipe and down towards the bottom of the outer pipe, where they turn to flow between the outer pipe and the inner pipe in the opposite direction and then into a waste gas channel which leads to the surroundings. The protective pipe delivers heat to a furnace space by convection, corresponding to 30%, and by radiation, corresponding to 70%.

A similar type of burner also comprises an inner pipe and an outer protective pipe which surrounds the inner pipe. However, in this case the bottom of the protective pipe is not closed. The protective pipe is curved, for instance in a U-shape configuration, and the free end of the protective pipe is connected to an exhaust gas or waste gas channel. The inner pipe equipped with the burner head is straight and is thus located within the straight section of the protective pipe.

It is desirable to maintain the outer pipe at a temperature of up to 1150–1200° C. so as to thereby enhance the power concentration of the burner. This is possible to achieve by producing the outer pipe from a high temperature material, such as silicon carbide (SiC) or APM. APM is an acronym of Advanced Powder Metallurgy, and the material contains about 73% Fe, 22% Cr, and 5% Al. The powder material is extruded into a tubular form.

According to this patent specification, gaseous fuel is introduced into one inlet and air is introduced into a separate inlet. It has been found that combustion will be more complete when the fuel is well mixed with the air of combustion. For this reason, it is proposed in accordance with this prior patent publication that a certain amount of air is delivered to the fuel inlet together with the fuel, while the remainder of the air of combustion is delivered through its own inlet. Because air is delivered to the fuel externally of the burner, this solution is encumbered with many drawbacks.

One drawback is that an explosive mixture of fuel and air may be present outside the actual burner, due to leakage downstream of the location at which fuel and air are mixed.

Another drawback is that the solution requires the use of several conduits, namely a fuel conduit and two air conduits connected to the burner. This results in confined spaces that make it difficult to carry out maintenance and servicing operations.

A third and decisive drawback is that the pre-mixture of air and fuel produced in the manner described in the patent specification has been found not to provide a maximum yield with respect to burner efficiency.

These drawbacks are avoided with the present invention.

SUMMARY OF THE INVENTION

The present invention thus relates to a gas burner of the type with which a burner head is placed in an inner pipe which is surrounded by an outer protective pipe. Waste gases from the burner head pass inside the inner pipe and then into the outer pipe, and thereafter into a waste gas channel which leads to the surroundings. Fuel is delivered to the burner head through a first conduit placed within the inner pipe, wherein air of combustion is delivered to the burner head through the space inwardly of the inner surface of the inner pipe. The first conduit terminates short of the burner head; in that the barrel surface of said conduit is perforated with holes, and a further pipe surrounds at least the perforated part of said conduit. One end of said further pipe extends to the burner head, whereas the other end of said further pipe is sealed against said conduit such as to form a mixing chamber between the outer surface of the conduit and the inner surface of said further pipe. A second conduit is connected to the barrel surface of said further pipe and is adapted to conduct a given amount of air to the mixing chamber.

BRIEF DESCRIPTION OF THE DRAWING

The invention will now be described in more detail partly with reference to an exemplifying embodiment of the invention shown in the accompanying drawing, in which.

DESCRIPTION OF THE PREFERRED EMBODIMENTS

Figure 1:
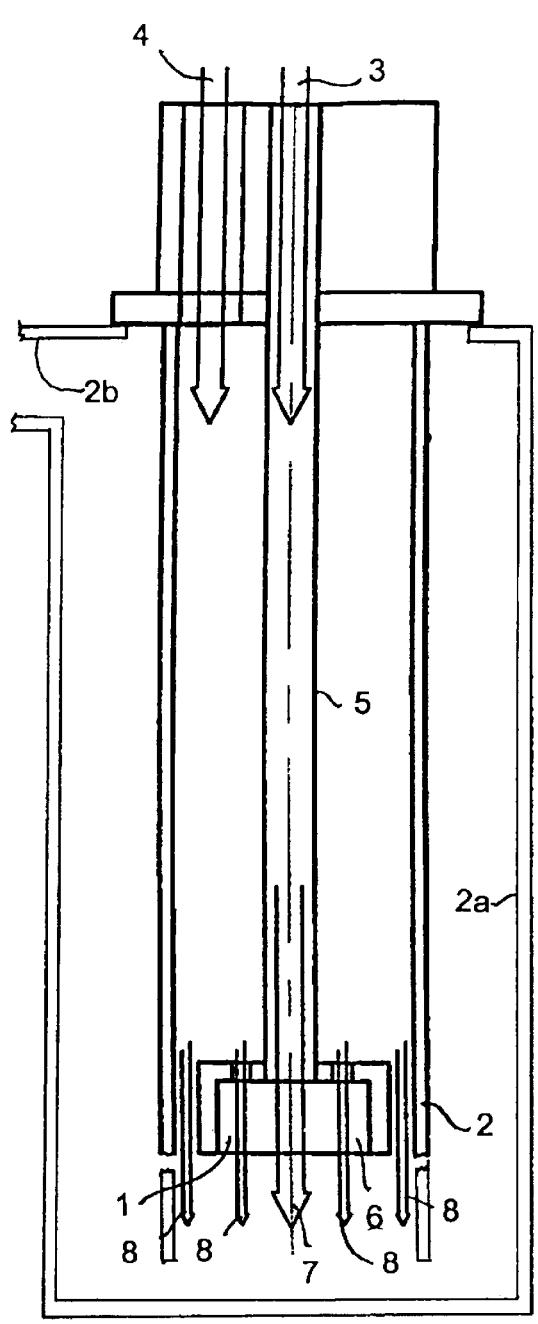
FIG. 1 is a cross-sectional view of part of a prior art burner.

FIG. 1 illustrates a known type of gas burner for heating furnaces. The gas burner is of the kind with which the burner head 1 is placed in one end of an inner pipe 2 which is surrounded by an outer protective pipe 2a. The outer protective pipe has a closed bottom. This means that the waste gases from the burner head will pass through the inner pipe 2 and down to the bottom of the outer pipe 2a where they turn to flow between the outer pipe and the inner pipe 2 in the opposite direction, and thereafter flow into a waste gas channel 2b that leads to the surroundings.

The invention is not limited to any particular gas burner, or to any other type of burner, but may equally as well have been described with reference to the above-mentioned type of burner, which also has an inner pipe that is surrounded by an outer protective pipe, but where the bottom of the protective pipe is not closed, but where the protective pipe extends in an arc and the free end of said pipe is connected to a waste gas channel.

According to this prior patent publication, a certain amount of air is delivered to the fuel inlet 3 together with the fuel, whereas the remainder of the air of combustion is delivered to its inlet 4. In this case, mixing of the fuel with said certain amount of air takes place when the air/fuel mixture flows through an inner pipe 5 down to the burner head 6, whereafter the mixture flows out through the burner head as illustrated by the arrow 7. The mixture is thereafter mixed with air of combustion, as shown by the arrows 8, wherewith combustion takes place.

Figure 2:
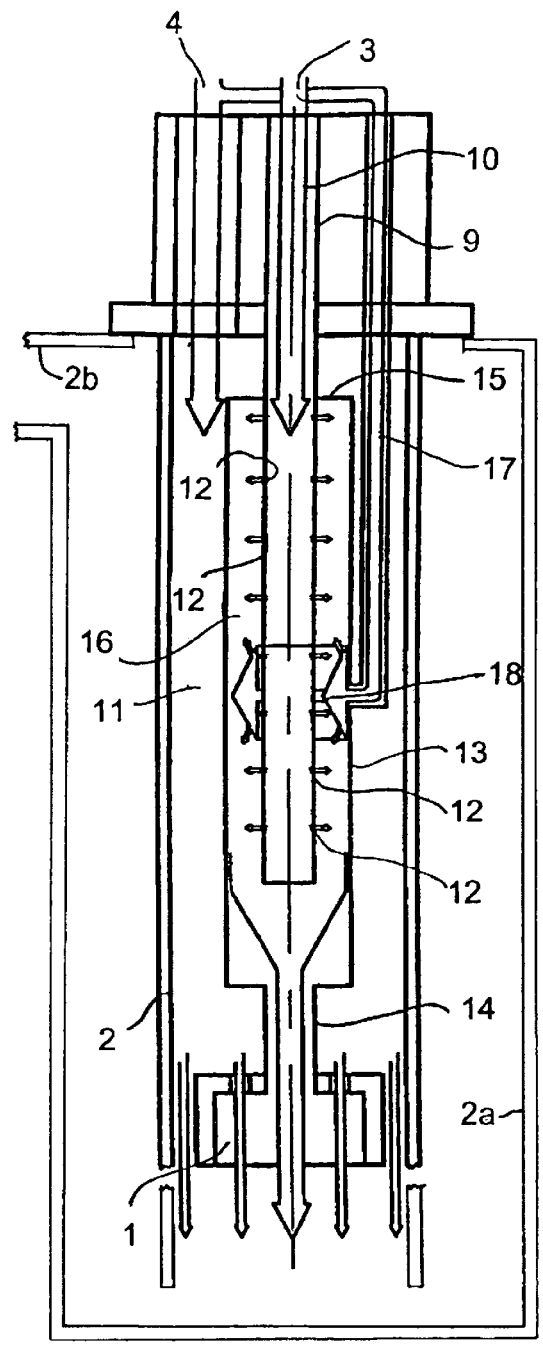
FIG. 2 is a cross-sectional view of part of an inventive burner.

FIG. 2 illustrates an inventive burner. This gas burner is also of the type in which a burner head 1 is placed in an inner pipe 2 which is surrounded by an outer protective pipe 2a. The waste gases from the burner head pass within the inner pipe 2 and down to the bottom of the outer pipe where they turn to flow between the outer protective pipe 2a and the inner pipe 2 in the opposite direction, and thereafter into a waste gas channel 2b that leads to the surroundings.

Fuel is delivered to the burner head 1 through a first conduit 9, as indicated by the arrow 10. The first conduit 9 is placed inside the inner pipe 2. Air of combustion is delivered to the burner head 1 through the space 11 inwardly of the inner surface of the inner pipe 2.

According to the invention, the first conduit 9 terminates short of the burner head 1. Holes 12 are provided in the barrel surface of the first conduit. A further pipe 13 surrounds at least that part of the conduit 9, which is provided with holes 12. One end 14 of the further pipe 13 extends to the burner head, while the other end 15 of said pipe 13 is sealed against the conduit 9 so as to form a mixing chamber 16 between the outside of the conduit 9 and the inside of the further pipe 13. Also included is a second conduit 17, which is connected to the barrel surface of the further pipe 13. This second conduit 17 is adapted to conduct a given amount of air to the mixing chamber, as indicated by arrow 18.

Fuel and said given amount of air are mixed very effectively through the mixing chamber 16, at the same time as said mixing chamber will be warm as a result of the heat radiated from the inner pipe 2 to the further pipe 13. The viscosity is low as a result of a higher temperature, thereby facilitating the mixing process.

As a result, warm air of combustion from the space 11 is mixed in the burner head 1 with a well-mixed and warm mixture from the mixing chamber, whereafter combustion takes place.

Measurements have shown that the efficiency of an inventive gas burner is increased by about 10%. Moreover, with the method described in the above-mentioned patent specification a further reduction in the $NO_x$-content of the waste gas is obtained. Moreover, it has been found that a burner constructed in accordance with the invention can withstand greater fluctuations with respect to fuel and air flow than known gas burners.

According to one preferred embodiment, the second conduit 17 extends within the inner pipe 2.

It is also preferred that the second conduit 17 is connected to the gas burner inlet 4 for combustion air.

This embodiment ensures that all explosive mixture is contained within the burner. Moreover, servicing and maintenance of the burner can be effected more easily, due to the fact that the number of conduits and hoses outside the burner have been reduced.

Although the invention has been described above with reference to a number of exemplifying embodiments thereof, it will be obvious to the person skilled in this art that the structural design of the burner can be varied with respect to its application.

The present invention shall not therefore be considered limited to the above-described and illustrated embodiments, since variations and modifications can be made within the scope of the accompanying claims.

What is claimed is:

1. A gas burner in which a burner head is placed in an inner pipe that is surrounded by and spaced inwardly of an outer protective pipe, wherein waste gases from the burner head pass along and through the inner pipe and then along and through the outer pipe and thereafter into a waste gas channel which leads to the surroundings, wherein fuel is delivered to the burner head through a fuel conduit positioned within the inner pipe, and wherein combustion air is delivered to the burner head through the space between the inner pipe and the outer pipe, said gas burner comprising: a fuel conduit positioned within the inner pipe and having a downstream end that terminates at a point spaced from the burner head and wherein said fuel conduit is provided with a plurality of holes to define a perforated part of said fuel conduit; a further pipe surrounding and spaced outwardly of at least the perforated part of said fuel conduit wherein a downstream end of the further pipe extends to the burner head and an upstream end of the further pipe is sealed against the fuel conduit to form a mixing chamber between an outer surface of the fuel conduit and an inner surface of the further pipe and wherein a second conduit is connected with a wall of the further pipe to conduct a given amount of air into the mixing chamber.

2. A gas burner according to claim 1, wherein the second conduit extends within the inner pipe.

3. A gas burner according to claim 1, wherein the second conduit communicates with a combustion air inlet of the gas burner.

4. A gas burner according to claim 1, wherein the second conduit extends between the inner pipe and the further pipe.

* * * * *